United States Patent [19]
Tung

[11] Patent Number: 5,842,297
[45] Date of Patent: Dec. 1, 1998

[54] LUMINANT SIGN

[75] Inventor: Ching-Yung Tung, Taipei, Taiwan

[73] Assignee: Flying Dragons Co. Ltd., Taipei, Taiwan

[21] Appl. No.: 795,304

[22] Filed: Feb. 4, 1997

[51] Int. Cl.$^6$ .................................................. G09F 13/18
[52] U.S. Cl. .............................................. 40/546; 40/812
[58] Field of Search ....................... 40/546, 547; 362/31, 362/812

[56] References Cited

U.S. PATENT DOCUMENTS

| | | | |
|---|---|---|---|
| 3,399,476 | 9/1968 | Davis | 40/546 X |
| 3,605,303 | 9/1971 | Reichow | 40/546 X |
| 3,748,769 | 7/1973 | Nolles | 40/546 X |
| 4,697,365 | 10/1987 | Moosbrugger et al. | 40/546 |
| 5,215,285 | 6/1993 | Lewis | 40/546 X |
| 5,433,024 | 7/1995 | Lerner | 40/546 |
| 5,640,792 | 6/1997 | Smith et al. | 40/546 |

FOREIGN PATENT DOCUMENTS

| | | | |
|---|---|---|---|
| 81 431 | 7/1931 | Australia | 40/546 |
| 2030750 | 4/1980 | United Kingdom | 40/546 |

*Primary Examiner*—Brian K. Green
*Attorney, Agent, or Firm*—Greer, Burns & Crain, Ltd.

[57] ABSTRACT

A luminant sign comprises a base including a pair of opposed casings and a image plate made of transparent acrylic resin and engaged with the base. The base has a circuit board with a plurality of illuminators disposed therein. A front face and a rear face of the image plate have a number of display areas defined thereon by peripheral grooves of pictures or words. Each display area has a plurality of reflective surfaces formed therein in directions non-parallel to the beam directions of the illuminators. With this arrangement, each display area of the image plate will achieve a uniform intensity.

12 Claims, 6 Drawing Sheets

LUMINANT SIGN

BACKGROUND OF THE INVENTION

1. Field of the Invention

The present invention relates to a luminant sign, and more particularly to a luminant sign whose display areas have a uniform intensity of light which shows clearly the message disposed therein.

2. Description of Related Art

Signs are used popularly in many places to draw the consumers' or users' attention. For example, signs are commonly used for indicating a telephone booth, a washroom, an exit or an entrance, and so on. Alternatively, signs, particularly luminant signs are used for advertisement purposes.

A kind of conventional luminant sign has a structure as shown in FIG. 6. The luminant sign has a base 50 includes a combined front and a rear casing (not numbered). One side of the base 50 defines a hole 52 such that the base 50 can be mounted to a wall. The base 50 has a fluorescent lamp 51 equipped with a stabilizer disposed therein. The luminant sign further has an image plate 60 made of transparent acrylic material. One side of the image plate 60 is gripped between the front and the rear casing. The image plate 60 has a number of display areas 62 defined thereon by peripheral grooves 61 of some pictures or words which are to be indicated. When the fluorescent lamp 51 illuminates the image plate 60, each display area 62 will become clear because of reflection of light. Though this kind of image plate has a luminant effect, it still has a disadvantage that the display area can not represent a uniform intensity of light such that the advertisement effect will be decreased and furthermore, the display area with lower intensity of light may be misunderstood by the users. The reason is that the fluorescent lamp 51 is located at one side of the image plate 60 such that the display areas 62 near the light source will be brighter (as the "A" area shown in FIG. 6) and the display areas 62 far from the light source will be relatively fainter (as the "B" area shown in FIG. 6).

The present invention provides an improved luminant sign to mitigate and/or obviate the aforementioned problems.

SUMMARY OF THE INVENTION

One object of the present invention is to provide a luminant sign whose display areas have a uniform intensity of reflective light.

In accordance with one aspect of the present invention, a luminant sign comprises a base combined with a pair of opposed casings and a image plate engaged with the base. The base has a circuit board with a plurality of illuminators mounted thereon. The image plate is made of transparent material, such as acrylic resin. A front face and a rear face of the image plate each has a number of display areas thereon defined by peripheral grooves of pictures or words. Each display area has a plurality of reflective surfaces defined therein in directions non-parallel to the beam directions of the illuminators.

In accordance with another aspect of the present invention, the pair of opposed casings are "U" shaped and each has two parallel ridges integrally extending from an inner face thereof. Each pair of the ridges defines a channel therebetween to receive the circuit board.

In accordance with a further aspect of the present invention, each of the pair of opposed casings further has two ledges integrally extending from a top and a bottom inner face thereof. Each of the ledges is formed as a hook such that a pair of enclosure covers can be engaged with two ends of the pair of opposed casings in a manner that two pairs of bosses integrally formed on the enclosure covers are respectively received in the corresponding ledges.

In accordance with still a further aspect of the present invention, one of the pair of opposed casings further has two protrusions integrally formed at an appropriate position of the inner face thereof. Each protrusion defines a screw hole therein, and wherein said image plate defines two holes respectively aligned with the screw holes of the protrusions such that the image plate can be engaged with the casing by means of two screws respectively extending through the hole and the screw holes.

Other objects, advantages and novel features of the invention will become more apparent from the following detailed description when taken in conjunction with the accompanying drawings.

DETAILED DESCRIPTION OF PREFERRED EMBODIMENT

Figure 1:
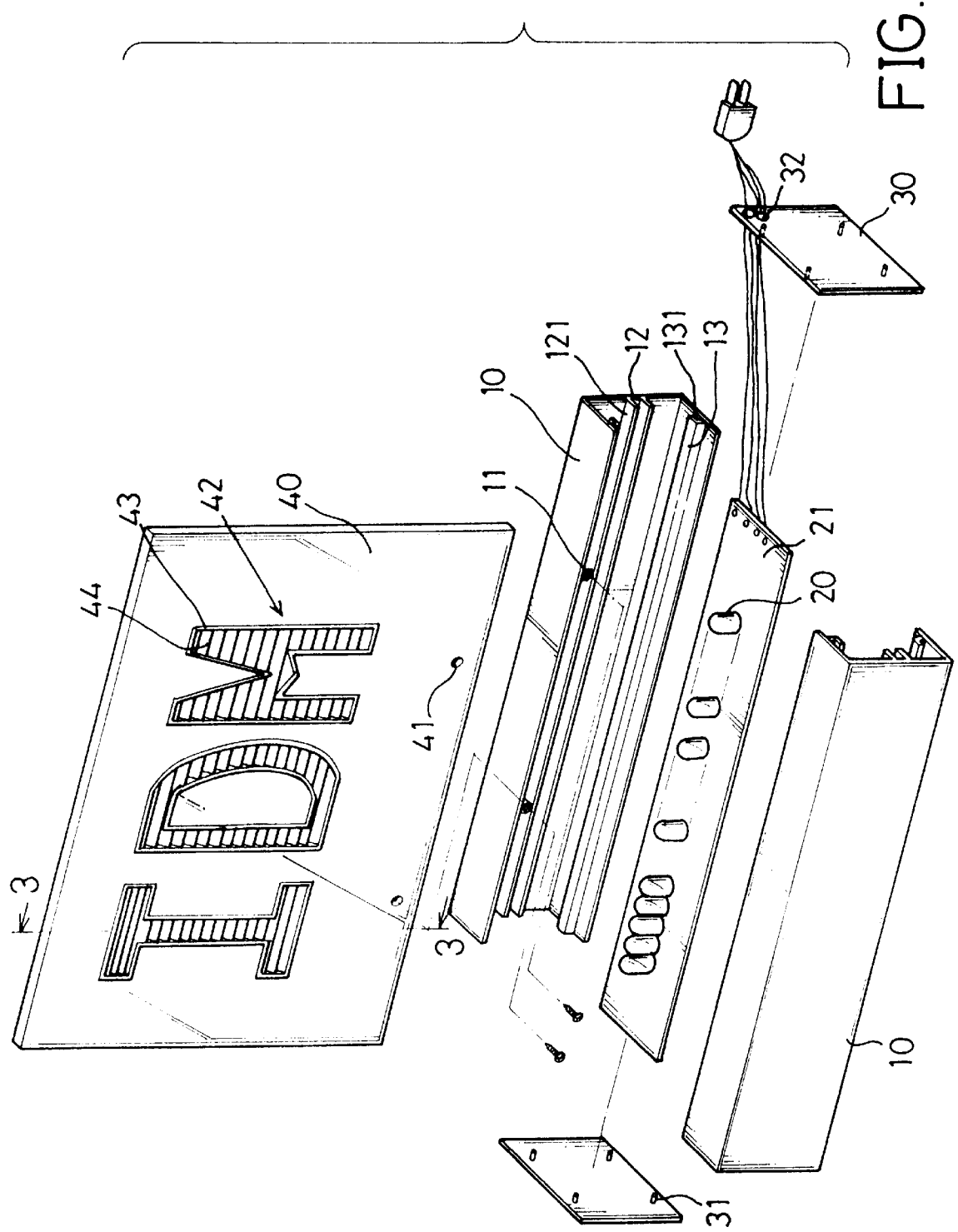
FIG. 1 is an exploded view showing a luminant sign in accordance with the present invention.
Figure 2:
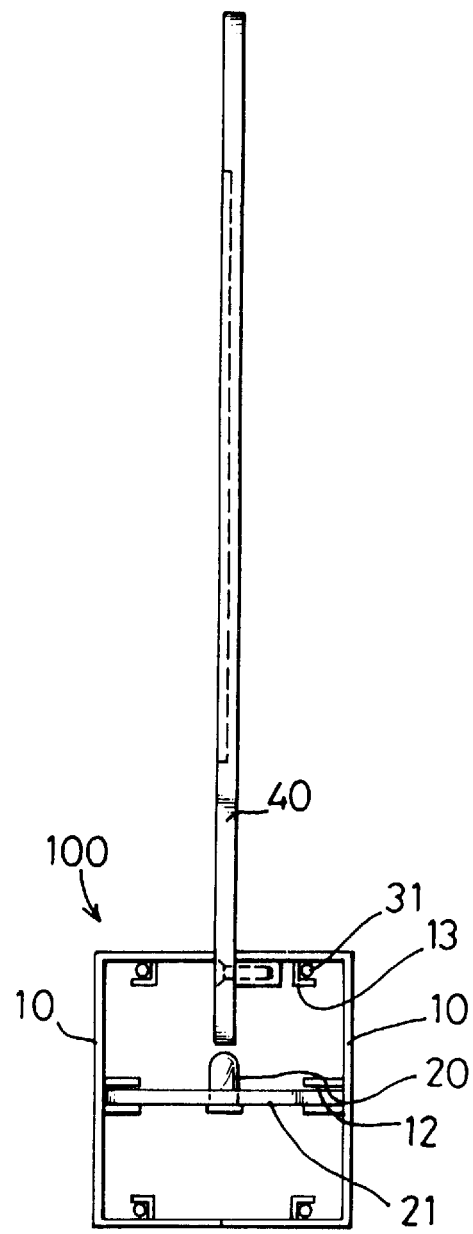
FIG. 2 is a cross-sectional side view showing a combined structure of the luminant sign in accordance with the present invention.

Referring to the Figures and especially to FIG. 1 and FIG. 2, a luminant sign in accordance with the present invention includes a base 100 consisting of a combined pair of opposed casings 10 and an image plate 40 engaged with the base 100.

The pair of opposed casings 10 are "U" shaped and each has two parallel ridges 121 integrally extending from an inner face thereof to define a channel 12 therebetween, whereby, a circuit board 21 with a plurality of illuminators 20 can be received within respective channels 12 defined in the pair of opposed casings 10.

Figure 5:
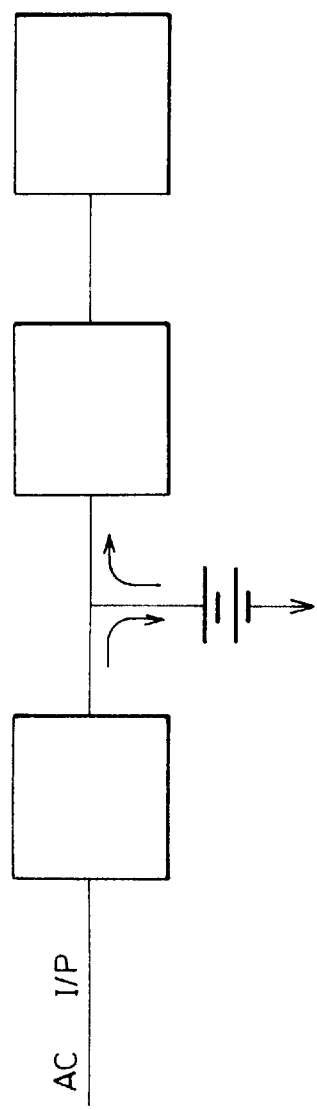
FIG. 5 is a diagram showing a circuit of the luminant sign in accordance with the present invention.
Figure 6:
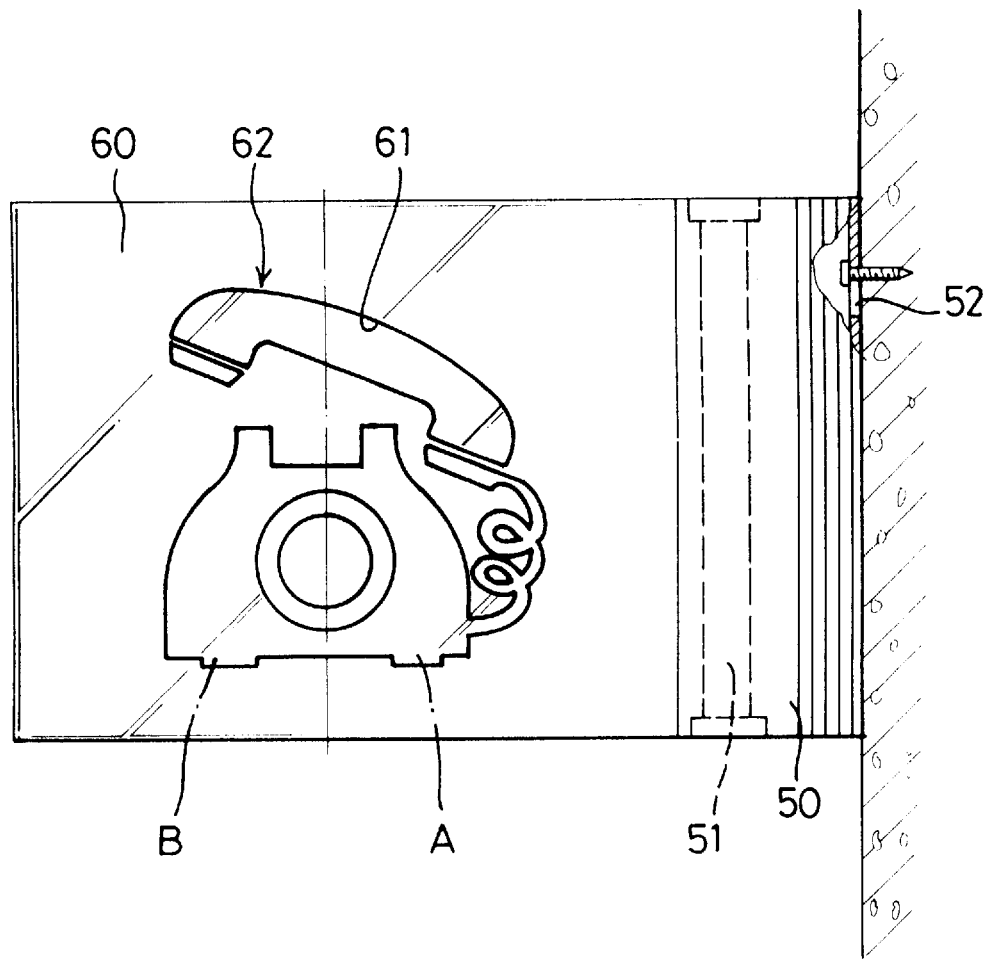
FIG. 6 is a front view showing a conventional luminant sign.

The circuit board 21 is connected to a charger 23, and a regulator 25 via a power supply 27 as shown in FIG. 5 to enable the illuminators 20 to emit light. The amount of the illuminators 20 can be adjusted according to requirements, in FIG. 1, for example, there may be fewer illuminators 20 below the word "I" than below the word "B" in order to improve the usage of illuminators 20. If the image plate 40 is wide and long, laser diodes with high intensity of light can be used as the illuminators 20.

Still referring to FIG. 1 and FIG. 2, each casing 10 further has two ledges 13 respectively extending from a top and a bottom of the inner face thereof. A cross section of each ledge 13 is shaped as a hook such that a pair of enclosure covers 30 can be engaged with two ends of the base 100 in a manner that two pairs of bosses 31 formed on each enclosure cover 30 are respectively received by the corresponding hooks defined by the ledges 13. One of the pair of enclosure covers 30 defines a plurality of through holes 32 at appropriate positions therein through which a group of wires (not numbered) connected with the circuit board 21 can extend.

Also, one of the pair of opposed casings 10 has a pair of protrusions 11 with screw holes (not numbered) therein integrally formed at an appropriate position on the inner face thereof and the image plate 40 defines a pair of holes 41 aligned with the screw holes of the casing 10, therefore, the image plate 40 can be secured with the casing 10 by a pair of screws (not numbered) extending through the screw holes and the holes 41, as shown in FIG. 2. It is to be noted that one or both of the opposed casings 100 has a cutout defined in a top edge thereof to accommodate the image plate 40.

Figure 3:
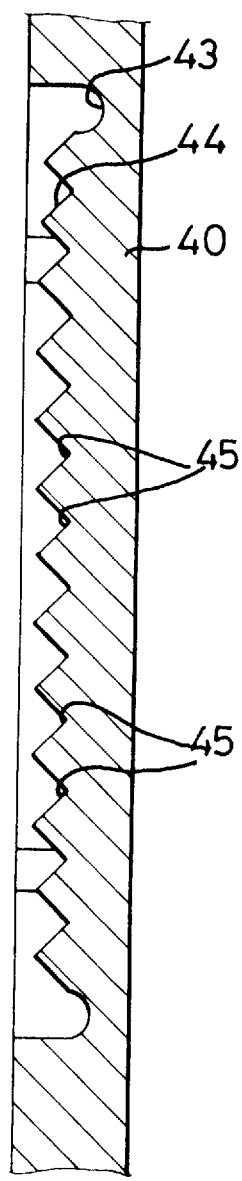
FIG. 3 is a cross-sectional side view along line 3—3 of FIG. 1, showing display areas of the luminant sign in accordance with the present invention.

The image plate 40 is made of transparent materials, such as acrylic resin. With a reference to FIG. 3, a front face and a rear face of the image plate 40 have a number of display areas 42 thereon defined by peripheral grooves 43 of some pictures or words which are to be represented. Each display area 42 has a plurality of reflective surfaces 44 formed therein in directions non-parallel to the beam directions of the illuminators 20 on the circuit board 21. The reflective surfaces 44 are defined by recesses 45 which are parallel to each other. The peripheral grooves 43 have groove portions which extend in a direction parallel to said recesses and other groove portions which extend in a direction which is nonparallel to the recesses 45. It is to be noted that a depth and an inclination of each reflective surface 44 can be varied during manufacture, depending on the requirements of constructions, for example, a side view of the display area 42 in FIG. 3 is prismatic-like.

Figure 4:
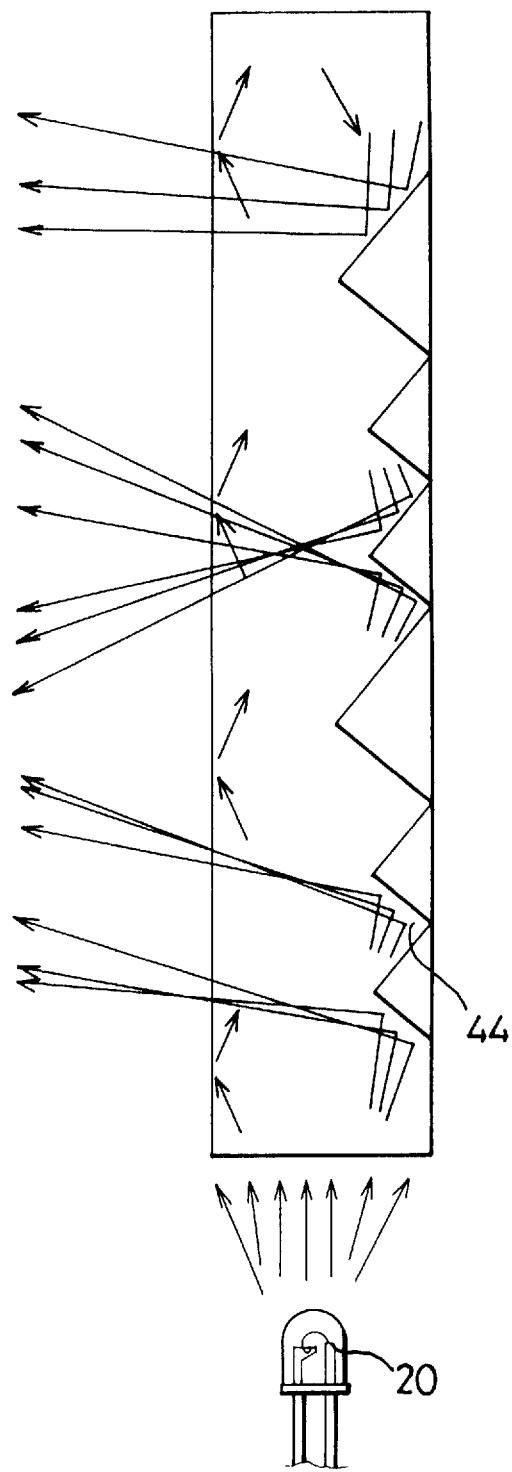
FIG. 4 is a schematic view showing the reflecting effect of the display areas cooperated with an illuminator of the luminant sign in accordance with the present invention.

Referring to FIG. 4, with the prismatic-like reflective surfaces 44, when the illuminator 20 illuminates the display area 42, a part of the light from the illuminator 20 is reflected, by some reflective surfaces 44 and directly sent to outside, other parts of the light from the illuminator 20 are continuously and repeatedly reflected by some other reflective surfaces 44 such that almost any position (including the peripheral grooves 43) in the display area 42 has the same probability to receive the light from the illuminator 20, thereby achieving a uniform brilliance.

In assembly, the image plate 40 is firstly engaged with one of the casings 10 in the above manner. Then the other casing 10 is abutted to the casing 10 with the image plate 40 and the circuit board 21 is inserted into the channels 12 defined by the pair of casings 10. Finally, the pair of enclosure covers 30 is engaged with both of the two ends of the casings 10 and secures together the two casings 10 by means of the bosses 31 received by the hooks of the casings 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad-general meaning of the terms in which the appended claims are expressed.

What is claimed is:

1. A luminant sign comprising:

a base having a pair of U-shaped opposed casings;

an image plate made of transparent material and engaged with said base;

said base having a circuit board with at least one illuminator mounted thereon, each said illuminator projecting light in a first direction, and each of said casings having a cutout defined in a top edge thereof to receive said image plate and board retaining means integrally extending from an inner face of at least one of said casings for receiving and retaining said circuit board;

a front face and a rear face of said image plate having a plurality of display areas defined by peripheral grooves having the shape of pictures or words, each said display area having a plurality of reflective surfaces defined therein, said reflective surfaces being formed by a plurality of parallel recesses, said peripheral grooves having groove portions which extend in a direction parallel to said recesses and other groove portions which extend in a direction which is nonparallel to said recesses, said surfaces being disposed on said plate to project in directions non-parallel to said light direction of said at least one illuminator.

2. The luminant sign as claimed in claim 1, wherein said board retaining means includes each casing having two ridges integrally extending from an inner face thereof, said two ridges defining a channel therebetween to receive the circuit board.

3. The luminant sign as claimed in claim 2, wherein said illuminators are light-emitting diodes (LED).

4. The luminant sign as claimed in claim 1, wherein each of said pair of opposed casings further has two ledges integrally extending from a top and a bottom inner face thereof, each of said ledges being hook-like and a pair of enclosure covers respectively engageable with two ends of said pair of opposed casings by means of two pairs of bosses integrally formed on said enclosure covers being respectively received in said ledges.

5. The luminant sign as claimed in claim 4, wherein at least one of said enclosure covers defines at least one through hole therein for wires electrically connected with said circuit board to be extended therethrough.

6. The luminant sign as claimed in claim 1, wherein one of said pair of opposed casings further has an inner face, and two protrusions integrally formed at an appropriate position of said inner face, each protrusion defining a screw hole therein, and wherein said image plate defines two holes respectively aligned with the screw holes of the protrusions such that the image plate can be engaged with the casing by means of fasteners extending through the holes and screw holes.

7. The luminant sign as claimed in claim 1, wherein a depth of the reflective surfaces is smaller than that of the peripheral grooves.

8. The luminant sign as claimed in claim 1, wherein a depth of the reflective surfaces is larger than that of the peripheral grooves.

9. The luminant sign as claimed in claim 1, wherein a depth of the reflective surfaces is equal to that of the peripheral grooves.

10. The luminant sign as claimed in claim 1, wherein said transparent material is acrylic resin.

11. A luminant sign comprising:

a base having a pair of U-shaped opposed casings, said base having a circuit board with a plurality of illuminators and each of said casings having a cutout defined in a top edge thereof;

an image plate made of transparent material and engaged with said base in which a front face and a rear face of the image plate having a number of display areas thereon defined by peripheral grooves of pictures or words, each display area having a plurality of reflective surfaces formed therein in directions non-parallel to beam directions of the illuminators;

each of said pair of opposed casings further has two ledges integrally extending from a top and a bottom inner face thereof, each of said ledges being hook-like, and a pair of enclosure covers respectively engaged with two ends of said pair of opposed casings by means of two pairs of bosses integrally formed on said enclosure covers being respectively received in said ledges.

12. A luminant sign comprising:

a base having a pair of U-shaped opposed casings, each said casing having two ridges internally extending from an inner face thereof, said two ridges defining a channel therebetween to receive the circuit board, each of said pair of opposed casings further having two ledges integrally extending from a top and a bottom inner face thereof, each of said ledges being hook-like, and a pair of enclosure covers respectively engageable with two ends of said pair of opposed casings by means of two pairs of bosses integrally formed on said enclosure covers being respectively received in said ledges;

an image plate made of transparent material and engaged with said base;

said base having a circuit board with at least one illuminator mounted thereon, each said illuminator projecting light in a first direction, and each of said casings having a cutout defined in a top edge thereof to receive said image plate and board retaining means integrally extending from an inner face of at least one of said casings for receiving and retaining said circuit board;

a front face and a rear face of said image plate having a plurality of display areas defined by peripheral grooves having the shape of pictures or words, each said display area having a plurality of reflective surfaces defined therein, said reflective surfaces being formed by a plurality of parallel recesses, said peripheral grooves having groove portions which extend in a direction parallel to said recesses and other groove portions which extend in a direction which is nonparallel to said recesses, said surfaces being disposed on said plate to project in directions non-parallel to said light direction of said at least one illuminator.

\* \* \* \* \*